United States Patent [19]

Redlich

[11] Patent Number: 4,926,123
[45] Date of Patent: May 15, 1990

[54] PRECISION VARIABLE PITCH COMPENSATION WINDING FOR DISPLACEMENT TRANSDUCER

[75] Inventor: Robert W. Redlich, Athens, Ohio

[73] Assignee: Sunpower, Inc., Athens, Ohio

[21] Appl. No.: 332,394

[22] Filed: Mar. 31, 1989

Related U.S. Application Data

[63] Continuation of Ser. No. 147,142, Jan. 22, 1988, abandoned.

[51] Int. Cl.⁵ .................. G01B 7/14; H01F 21/06
[52] U.S. Cl. ........................ 324/208; 29/605; 324/225; 324/234; 324/207.17; 336/45; 336/136
[58] Field of Search ............ 324/207, 208, 225, 234; 336/45, 130, 136, 179–181, 224; 340/870.31–870.36; 29/602.1, 605–607

[56] References Cited

U.S. PATENT DOCUMENTS

| | | | |
|---|---|---|---|
| 2,477,749 | 8/1949 | Jacob | 336/136 XR |
| 2,489,114 | 11/1949 | Vladimir | 336/136 XR |
| 2,621,324 | 12/1952 | Pan | 336/224 XR |
| 3,017,590 | 1/1962 | Chass | 336/136 |
| 3,891,918 | 6/1975 | Ellis | 324/208 |
| 4,134,065 | 1/1979 | Bauer et al. | 324/208 |
| 4,350,954 | 9/1982 | Seilly | 324/236 XR |
| 4,502,006 | 2/1985 | Goodwin et al. | 324/234 XR |
| 4,623,840 | 11/1986 | Fujimura et al. | 324/208 |
| 4,667,158 | 5/1987 | Redlich | 324/234 XR |

FOREIGN PATENT DOCUMENTS

| | | | |
|---|---|---|---|
| 903171 | 8/1962 | United Kingdom | 324/207 |
| 1558206 | 12/1979 | United Kingdom | 324/208 |

Primary Examiner—Gerard R. Strecker
Attorney, Agent, or Firm—Frank H. Foster

[57] ABSTRACT

A compensation winding for improving the linearity of a displacement transducer. The displacement transducer is the type having an electrically conducting non-ferromagnetic wall which moves in telescoping relation with the coil and is excited by a signal at a sufficiently high frequency that skin effect on the wall permits displacement of the wall to vary the reluctance of the coil flux path and thereby vary its inductance proportionally to displacement of the wall. The compensation winding is wound in telescoped, coaxial relationship to the coil in a fixed position. The compensation winding has a pitch which is a decreasing function of the distance from the end of the coil which is nearest the wall when the wall and the coil are in their least overlapping relationship.

10 Claims, 2 Drawing Sheets

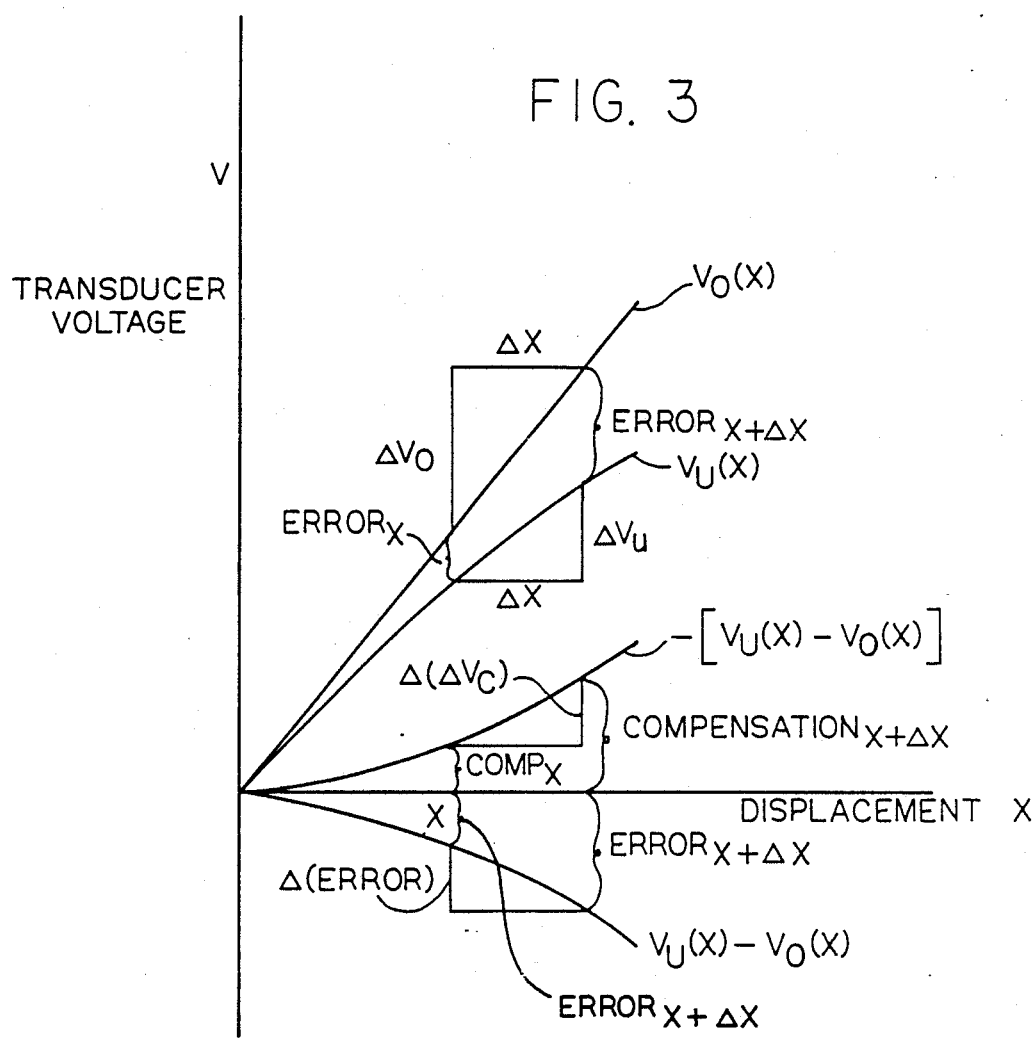

PRECISION VARIABLE PITCH COMPENSATION WINDING FOR DISPLACEMENT TRANSDUCER

This is a continuation of application Ser. No. 07/147,142, filed Jan. 22, 1988 and now abandoned.

Technical Field

This invention relates generally to an improvement of a displacement transducer of the type having a coil and an electrically conducting, non-ferromagnetic wall moving in telescoping relation with the coil and excited by a signal of a sufficiently high frequency that skin effect in the wall permits wall displacement to vary the reluctance of the coil flux path and thereby vary its inductance, approximately proportionally to displacement. More particularly the invention is a compensation winding, wound upon or in the coil for substantially improving its precision.

BACKGROUND ART

A linear displacement transducer of this type is shown in my previous U.S. Pat. No. 4,667,158 and is illustrated in FIG. 1. The transducer is a helical coil 2 of an electrical conductor wound at a uniform pitch on cylindrical thin-walled tube or bobbin 1 of an electrical insulator or a poor conductor such as stainless steel. Preferably, the tube also has suitable properties for use as a dry bearing surface, for example Teflon. The helical coil 2 is fixed to the first of two relatively movable bodies for which the relative displacement is to be measured.

A non-ferromagnetic, electrically conducting rod or preferably a tube forms a core 3 which is slidable within the bobbin 1. It is made, for example, of aluminum or copper and is fixed to the second of the two relatively moving bodies.

Preferably the coil is surrounded by a low and constant reluctance path so that changes in coil inductance with respect to core 3 movement is maximized. This is preferably accomplished by positioning a material, such as ferrite 5, having a high magnetic permeability, but low electrical conductivity surrounding the coil. This material provides the desired low magnetic reluctance while not permitting the formation of significant eddy currents and not exhibiting a substantial skin effect.

Preferably this high permeability, low conductivity material is itself surrounded with a tubular shield 4 of high electrical conductivity to confine the field of the coil to the ferrite 5 and the skin layer of the shield 4 and to prevent external fields from linking with the coil 2. The shield 4 confines the magnetic flux generated from stray fields by the current in the coil 2 and shields it over a wide frequency range. It is preferably made of a material having both high electrical conductivity and high magnetic permeability, such as soft iron or low carbon steel.

An AC electrical energy source 6 and a detector circuit means 7, preferably in the form of a bridge circuit, are electrically connected to the coil 2. The AC source 6 operates at a frequency, preferably in the range of 50-200 Khz, which may be designated a carrier frequency $f_c$. An important key to the efficient and effective operation of a transducer of this type is that the frequency of the source 6 be high enough that the skin depth in the core 3 is substantially less than the radius of the core and less than the thickness of the wall of the tube.

The source 6 drives the coil through a resistor 8 which has a resistance which is much greater than the inductive reactance of the coil and its associated structures so that effectively the transducer is driven by a current source. Therefore, the voltage across the transducer coil 5 is approximately $(V/R)*(2 \pi f_c L)$.

The detector circuit 7 detects a signal at an AM detector 9 which is proportional to the inductance of the coil 2 and its associated structures. The coil voltage is proportional to coil inductance, which in turn is proportional to the displacement of the core 3.

In the operation of the basic concept of the displacement measurement apparatus of FIG. 1, the AC source 6 excites the bridge circuit, including the transducer coil 2 in one of its branches Because of the skin effect at the frequency at which the AC source 6 is operating, magnetic fields in the core 3 are confined to a thin layer approximately equal to the sum of the skin depth in the core material which is typically on the order of 0.25 millimeters thick plus the spacing from the exterior of the core 3 to the interior of the coil 2. Because the skin depth is considerably less than the radius of the core, the magnetic flux is confined to a path in the region of the core 3 which has a considerably smaller cross-sectional area than the flux path where there is no core 3. Since reluctance is inversely proportional to the cross-sectional area of the flux path, the core 3 has the effect of substantially increasing the reluctance and therefore substantially reducing the magnetic flux in the region of the core. With the core 3 partially inserted in the coil 2 of the transducer, the interior of the coil 2 can be divided into the region occupied by the core 3 where magnetic flux is low, and the region unoccupied by the core where magnetic flux is relatively high compared to the core region. Therefore, the flux linkages of the coil are substantially reduced as a result of the insertion of the core and are reduced in proportion of the extent of the insertion of the core within the coil 2. This, in turn, proportionally reduces the self inductance of the coil 2. Thus, the movable core varies the self inductance and the impedance and therefore varies the voltage across the transducer in proportion to its displacement.

While a great variety of detector circuits are known to those skilled in the art for detecting a signal which is proportional to the changes in coil inductance or voltage, the detector circuit of FIG. 1 operates well. A bridge is designed to be brought into AC amplitude balance by adjustable resistor 10 when the core 3 is centered within the coil 2. The AC source 6 is a signal at a frequency $f_c$. The amplitude of the transducer signal at frequency $f_c$ at the node 11 of the bridge is proportional to the displacement of the core 3. The amplitude of the balance signal at frequency $f_c$ at the opposite node 12 is adjusted so that it is equal to the amplitude of the transducer signal at node 11 when the core 3 is centered within the coil 2. A detector circuit means comprising two AM detectors 9A and 9B and a differential amplifier 14 are provided to detect the difference between the modulation amplitudes at the nodes 11 and 12.

The displacement of the core 3 is effectively providing an amplitude modulated signal at the terminal 11, the amplitude of which is proportional to displacement of the core 3 and may be detected by the AM detector 9B to provide an output signal which is directly proportional to the displacement of the core 3. The balance signal at node 12 is detected by an AM detector circuit 9A. The output signals from the two AM detectors 9A and 9B are applied to a differential amplifier 14, the output of which provides a signal $V_{out}$ which is proportional to the displacement of the core 3. Further details of the basic concept are described in more detail in my above cited U.S. Patent.

One problem with a transducer constructed as described above is that its inductance and therefore the output voltage of the detector means is not exactly proportional to the relative displacement x shown in FIG. 1 of the core 3 into the coil 2. The relative displacement x is measured as the position of the interior end 18 of the core 3 with respect to the right end 24 of the coil 2. If the transducer were operating as an ideal linear transducer, the output voltage signal would be proportional to the displacement x and therefore dV/dx would be constant over the entire length of the coil.

Instead, however, for the simple coil illustrated in FIG. 1, dV/dx decreases as the displacement x increases so that the transfer function, designate $V_u(x)$ in FIG. 3 falls below the ideal linear relationship $V_o(x)$ as x increases. This occurs for two reasons.

The loss in the device of FIG. 1 increases as the core 3 is displaced further into the coil 2. Losses become greater as the core displacement increases because the core itself is relatively lossy and therefore there is more lossy core in the field as the core insertion or displacement x increases.

The non-uniformity of the flux in the transition region 23 adjacent the left end of the core 3 also contributes significantly to this nonlinearity. FIG. 1 illustrates a portion of the flux lines 20 which have a radial component in the transition region 23 of the flux 22 to join the boundaries of the uniform flux on opposite sides of this transition region 23. This transition region produces an end effect which causes an increasing departure from linearity as the displacement of the core 3 increases. The reason the end effects increase as the displacement of the core 3 into the coil 2 increases is that, as the insertion x increases, the transition region 23 occupies an increasingly greater proportion of the segment of the coil 2 which is not occupied by the core 3. There is, of course, no sharp boundary for the transition region. However, we have found that end effects become negligeable within approximately three coil diameters from the end 18 of the core 3. The total departure of the transfer function $V_u(x)$ for the simple, uncompensated coil illustrated in FIG. 1 from the transfer function $V_o(x)$ of an ideal, linear coil is designated as the ERROR in FIG. 3.

It is therefore an object and feature of the present invention to substantially eliminate this error so that transducer displacement becomes a more accurate and precise linear function of core displacement into the coil.

A further object and feature of the invention is to provide such an improvement in a manner which may be economically mass produced.

BRIEF DISCLOSURE OF INVENTION

The invention improves the displacement measurement apparatus described above by means of a compensation winding which is wound coaxial relationship to the coil. The compensation winding has a pitch which is a decreasing function of its distance x from the end of the coil which is nearest the wall of the core when the core wall and the coil are in their least overlapping relationship. The compensation winding decreases and ideally eliminates the non-linearity of the inductance of the coil as a function of core wall displacement.

BRIEF DESCRIPTION OF DRAWINGS

FIG. 3 is a graph illustrating the design and operation of the preferred embodiment of the invention.

Figure 1:
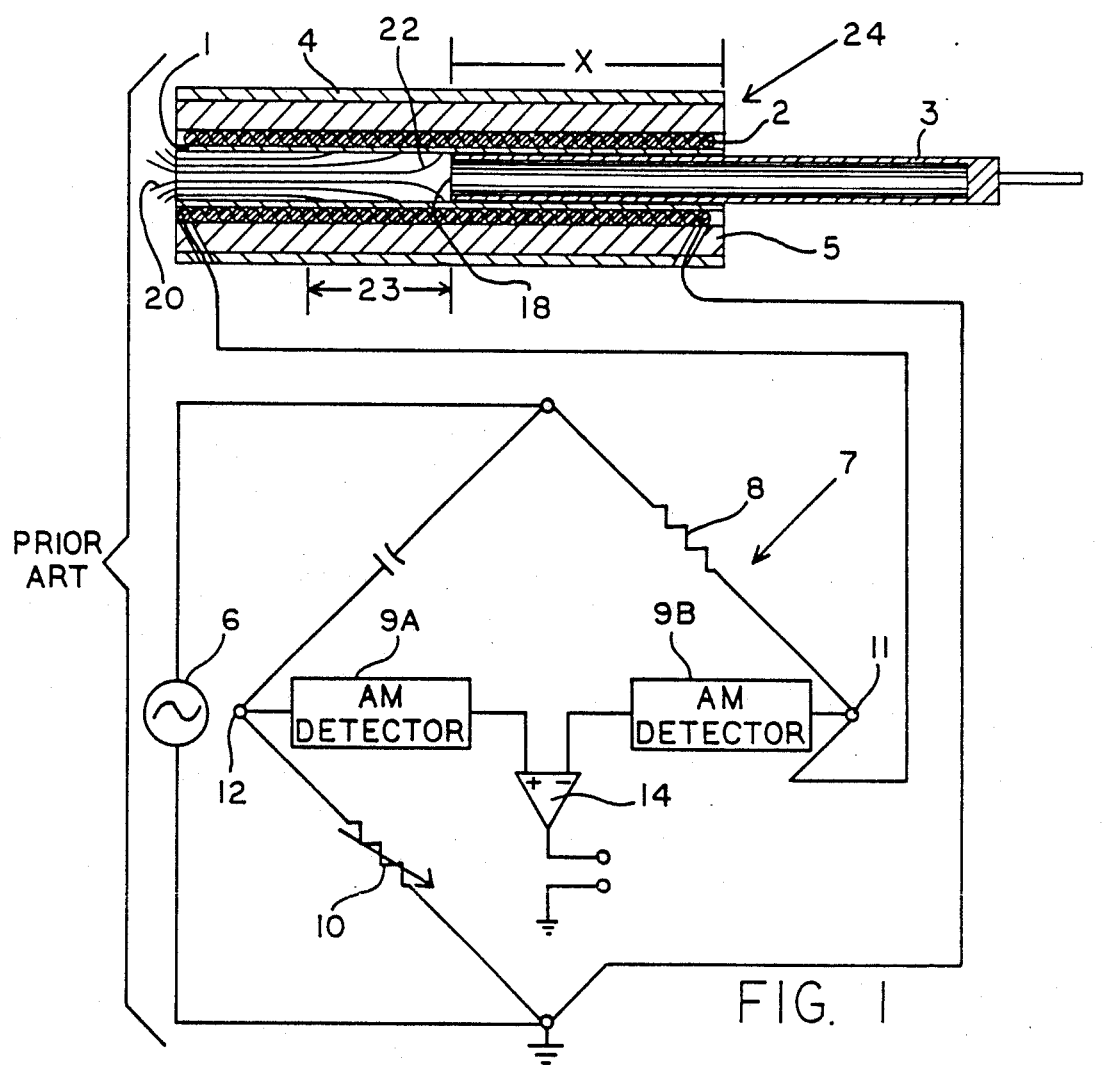
FIG. 1 is a diagrammatic and schematic drawing illustrating the prior art transducer and measuring apparatus illustrated in my prior U.S. Pat. No. 4,667,158.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION

Figure 2:
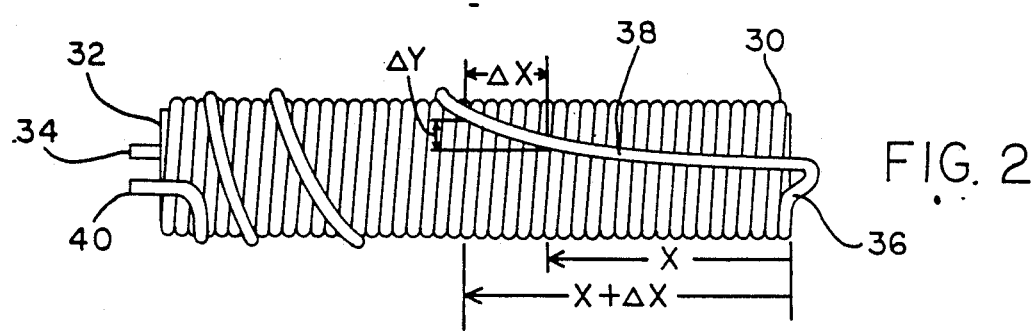
FIG. 2 is a view in side elevation of the compensation winding embodying the present invention.

FIG. 2 illustrates the coil portion of a displacement measuring transducer embodying the compensation winding of the present invention. The simple, uncompensated coil 30 begins at the left end 32 of the coil 30 at the conductor end 34. It extends in helical windings to the right end 36 of the conductor. The same conductor then continues back to form the compensation winding 38 of the present invention which begins at the right end 36 of the coil 30 and doubles back over the main winding 30 to terminate at conductor end 40. A compensation winding ordinarily consists of only a few turns, but has a smoothly and continuously decreasing pitch as it progresses from the right end to the left end of the uncompensated main winding 30. More specifically, the compensation winding has a pitch which is a decreasing function of the distance from the end of the coil 30 which is nearest the core 3 or sliding wall 50 shown in FIG. 2A when the coil and the wall are in their least overlapping relationship.

Figure 2A:
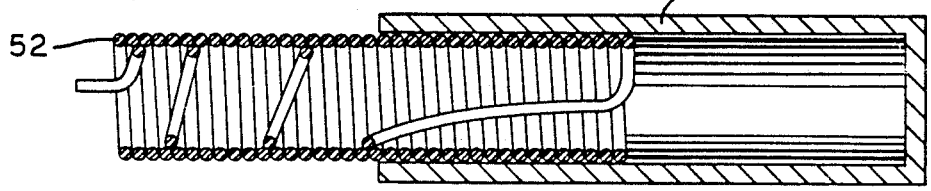
FIG. 2A is a view in axial section of an alternative embodiment of the invention.

The compensation winding is wound in a coaxial preferably telescoped relationship to the coil either within or outside of the uncompensated main coil 30. The compensation winding may, as illustrated in FIG. 2A, be wound within the interior of the uncompensated main winding. This accommodates embodiments of the invention in which the sliding wall of electrically conducting, non-ferromagnetic material is a tube 50 which surrounds instead of sliding within the main coil 52. The compensation winding is wound in the same direction as the uncompensated main winding 30 and preferably is a continuation of the identical coil conductor.

A compensation signal which is equal and opposite to the error is induced in the compensation winding and added to the voltage across the main winding. The error is the difference between the ideal linear function $V_o(x)$ and the nonlinear function $V_u(x)$ in FIG. 3 of an uncompensated coil.

The compensation winding structure may be optimized by the use of design equations developed in accordance with the present invention in order to optimize the compensation and thereby make the transfer function of the transducer substantially linear. Referring now to FIG. 3, the linear transfer function relating transducer voltage V to transducer displacement x is illustrated for both an ideal linear transfer function $V_o(x)$ and an actual measured and plotted uncompensated coil transfer function $V_u(x)$. The difference between the graphs of these functions represents the error which the compensation winding should compensate for and thereby eliminate. FIG. 3 illustrates the error at two different displacement positions x and $x+\Delta x$.

The main uncompensated coil and the compensation winding may be described in terms of the following variables, most of which are illustrated in FIG. 3.

DEFINITIONS OF VARIABLES

1. C=circumference of the main, uncompensated coil.
2. $N_o$=linear turns density in turns/cm of the uncompensated main coil
3. N(x)=linear turns density in turns/cm of the compensated coil and is a function of x.
4. $N_c(x)$=linear turns density in turns/cm of the compensation winding and is a function of x.
5. x=core position in cm.
6. $\Delta x$=incremental core displacement from x to $x+\Delta x$.
7. $\Delta y$=circumferential extent of compensation winding in an increment $\Delta x$ in cm.
8. $\Delta V_u$=change in uncompensated output voltage as the core goes from x to $x+\Delta x$ in volts and is a function of x.
9. $\Delta V_o$=change in the output voltage of an ideal, linear transducer as the core goes from x to $x+\Delta x$ in volts.
10. error=$V_o-V_u$, the difference in output voltage between an ideal and an uncompensated transducer.
11. $E=\Delta V_o-\Delta V_u$, the change in error in increment $\Delta x$.
12. $(\Delta V_c)$=component of change in the compensated transducer voltage arising from the compensation winding as x goes from x to $x+\Delta x$ in volts and is a function of x.
13. $\Delta T_c$=number of the compensation winding turns in any increment $\Delta x$.

From FIG. 3 it is apparent that the incremental error denoted E for the uncompensated transducer in going from the error at x to the error at $x+\Delta x$ can be described by the equation:

14. $E=\Delta V_u-\Delta V_o$

For a transducer which has a compensation winding in accordance with the present invention, the number of turns per unit of length along the coil may be expressed by the following equation:

15. $N(x)=N_o+N_c(x)$

For any inductor driven by a current source and with substantially constant N(x) the following proportionalities are both true if end effects are small.

16. $\Delta V=K_1 \Delta L$, and
17. $\Delta L=K_2 N^2(x) \Delta x$
18. Therefore $\Delta V=KN^2(x)\Delta x$ If equation 15 is substituted in equation 18 then:

19. $\Delta V=K[N_o+N_c(x)]^2 \Delta x$

If we make the practical assumption that $N_o >> N_c(x)$ then equation 20 simplifies to:

20. $\Delta V=K\Delta x(N_o^2+2N_o N_c(x))$

The two terms on the right side of the equation can be seen to represent components of the change in coil voltage resulting respectively from the uncompensated main coil without end effects and from the compensation winding. This may be expressed by the equations:

21. $\Delta V_o=KN_o^2\Delta x$
22. $(\Delta V_c)=2KN_o N_c \Delta x$

From equations 21 and 22 the following proportionality may be stated:

$$23. \frac{(\Delta V_c)}{\Delta V_o} = \frac{2N_c}{N_o}$$

The desired result is cancellation of E by $\Delta V_c$. From equation 23, this result is achieved if:

$$24. N_c = \frac{N_o E}{2\Delta V_o}$$

Equation 24 gives for any interval $\Delta x$ between x and $x+\Delta x$, the number of compensation turns per centimeter $N_c(x)$ in that interval, i.e. the reciprocal of the spacing between turns for the compensation winding.

The number of compensation turns $\Delta T_c$ in the interval $\Delta x$ is:

25. $\Delta T_c=N_c \Delta x$

Substituting equation 25 in equation 24 provides that the number of compensation turns in the incremental interval $\Delta x$ is:

$$26. \Delta T_c = \frac{N_o \Delta(\text{error})\Delta x}{2\Delta V_o}$$

This can be rearranged to be stated as:

$$27. \Delta T_c = \frac{\Delta(\text{error})}{\frac{2(\Delta V_o)}{N_o \Delta x}}$$

However, the volts per turn of the uncompensated coil without end effects $V_T$ can be described as:

$$28. V_T = \frac{\Delta V_o}{N_o \Delta x}$$

Therefore, the number of compensation turns in any incremental distance from x to $x+\Delta x$ is stated by the equation:

$$29. \Delta T_c = \frac{E}{2V_T}$$

Because, as illustrated, the number of turns is often a fraction of a turn in an increment $\Delta x$, an alternative manner of mathematically describing the compensation winding may also be obtained which defines the compensation winding in terms of its circumferential advance as a function of position x. Since one turn of winding is a circumferential advance of C, the circumferential advance $\Delta y$ in the incremental interval $\Delta x$ is given by:

30. $\Delta Y=C\Delta T_c$

Therefore, from equations 29 and 30 the circumferential advance may be given by the formula:

$$31. \Delta y = \frac{C(\Delta(\text{error}))}{2V_T}$$

In order to construct a compensation winding in accordance with the present invention an uncompensated main coil is assembled into an uncompensated transducer and displacement measuring circuit. The output voltage of the AM detector 9, which is proportional to the voltage across the coil 2 of FIG. 1, is measured and recorded for each of a plurality of spaced apart positions of the core 3 within the operating range of the transducer. These are plotted on a graph similar to FIG. 3, and the plot represents the uncompensated transfer function for the output signal amplitude as a function of displacement. This provides a plot of $V_u(x)$. $V_o(x)$ is then determined by finding the straight line linear transfer function which is tangential to the uncompensated transfer function $V_u(x)$ at the minimum displacement of $x=0$.

The difference between these two plotted transfer functions at each of the displacement positions at which a measurement was taken represents the error at each of those displacement positions.

The difference between the errors at each pair of adjacent positions is the error which is substituted in equation 31. In order to obtain $V_T$, the volts/turn, the number of turns in the increment between adjacent measurement positions is obtained simply by determining the total number of turns in the uncompensated coil, dividing that by the total length of the coil, and then multiplying by the length of $\Delta x$ to provide the number of turns in the increment $\Delta x$ between each pair of measurement positions. The voltage in that increment $\Delta x$ is simply determined by subtracting the voltage at one position from the voltage at the adjacent position. Dividing this voltage difference by the number of turns gives the $V_T$ for that increment.

The circumferential advance of the compensation winding between each pair of adjacent positions is then calculated by substituting these two values in equation 31. This is done for each pair of adjacent displacement positions until the complete, continuous compensation winding is wound upon the main coil 30.

It is advantageous to plot or tabulate the voltage for approximately each 2% increment of the length of the coil to provide approximately 50 readings over the entire range. I prefer to begin at $x=0$ with the core or outer slidable wall, approximately one-half of one percent inserted within the coil to eliminate any initial end effects. I have also found it advantageous to not extend the core into approximately the last one and one-half diameters of the end of the coil because the compensation winding becomes so critical in that region that it is very difficult to compensate the transducer in that region.

While certain preferred embodiments of the present invention have been disclosed in detail, it is to be understood that various modifications may be adopted without departing from the spirit of the invention or scope of the following claims.

I claim:

1. An improved displacement measurement apparatus of the type having a current conducting coil for attachment to a first one of two relatively movable bodies, an electrically conducting, non-ferromagnetic wall in telescoping relationship to said coil and mounted to the second body for axial displacement relative to the coil for varying their relative overlap and thereby vary the inductance of the coil, an AC electrical energy source which is connected to apply an AC signal to the coil at a frequency which is at least high enough that the skin depth of the wall is less than the physical depth of the wall and a detector circuit means connected to the coil for detecting a signal which is proportional to coil inductance, the improvement comprising:

a compensation winding wound in coaxial relationship to said coil and connected to said AC source, the compensation winding having a pitch which is a continuous decreasing function of distance from the end of the coil which is nearest said wall when the wall and the coil are in their least overlapping relationship, said compensation winding extending along at least the entire operative length of the coil and decreasing the non-linearity of the inductance variation as a function of wall displacement.

2. An apparatus in accordance with claim 1 wherein said compensation winding is wound upon the exterior of said coil in the same direction and is a continuation of the coil conductor.

3. An apparatus in accordance with claim 2 wherein said wall is slidable into the interior of the coil.

4. An apparatus in accordance with claim 1 wherein said compensation winding is wound inside said coil and in the same direction and is a continuation of the coil conductor.

5. An apparatus in accordance with claim 4 wherein said wall is slidable into surrounding engagement of said coil.

6. An apparatus in accordance with claim 1 or 2 or 3 or 4 or 5 wherein the pitch of the compensation winding provides sufficient additional ampere-turns of magnetomotive force to counter-balance relative losses and end effects which increase with the relative overlap of said coil and said wall.

7. An apparatus in accordance with claim 1 or 2 or 3 or 4 or 5 wherein the compensation winding is in accordance with the relationship:

$$\Delta T_c = \frac{E}{2V_T}$$

wherein
$V_T$ = the change in voltage across the uncompensated coil as the wall moves x to $x+\Delta x$ divided by the number of turns of the uncompensated winding in the incremental interval $\Delta x$;
E = Error, the voltage difference between the change in the coil voltage of an uncompensated coil as the wall moves from x to $x+\Delta x$ and the change in an ideal, linear, compensated coil voltage as the wall moves from x to $x+\Delta x$;
$\Delta T_c$ = number of turns of compensation winding between x and $x+\Delta x$;
x = a first displacement from said coil end; and
$\Delta x$ = the incremental displacement from the coil end beyond x.

8. An apparatus in accordance with claim 1 or 2 or 3 or 4 or 5 wherein the compensation winding is in accordance with the relationship:

$$\Delta Y = \frac{E \times C}{2V_T}$$

wherein
$V_T$ = the change in voltage across the uncompensated coil as the wall moves x to $x+\Delta x$ divided by the number of turns of the uncompensated winding in the incremental interval $\Delta x$;

E = Error, the voltage difference between the change in the coil voltage of an uncompensated coil as the wall moves from x to x+Δx and the change in an ideal, linear, compensated coil voltage as the wall moves from x to x+Δx;

C = circumference of main, uncompensated coil

ΔY = circumferential advance of the compensation winding as wall goes from x to x+Δx.

x = a first displacement from said coil end.

x+Δx = incremental displacement from the coil end beyond x.

9. A method for forming a compensation winding upon a displacement measuring apparatus of the type having an elongated, current conducting coil for attachment to a first one of two relatively movable bodies, an electrically conducting, non-ferromagnetic wall in telescoping relationship to said coil and mounted to the second body for axial displacement relative to the coil for varying their relative overlap and thereby vary the inductance of the coil, an AC electrical energy source which is connected to apply an AC signal to the coil at a frequency which is at least high enough that the skin depth of the wall is less than the physical depth of the wall and a detector circuit means connected to the coil for detecting a signal which is proportional to coil inductance, the method comprising:

(a) recording a detected signal amplitude which is proportional to coil inductance for each of a plurality of spaced apart wall displacement positions over an operating range of the measurement apparatus to represent the uncompensated transfer function for the signal amplitude as a function of displacement;

(b) determining the desired, linear signal amplitude for each of said wall displacement positions for a linear transfer function which is tangential to said uncompensated transfer functions at the minimum displacement;

(c) determining the difference between the recorded detected amplitude and the desired linear amplitude for each of said wall displacement positions; and (d) forming a compensation winding in telescoping coaxial relationship to the coil and having a current and winding direction to increase the magnetomotive force in the coil, said compensation winding having a circumferential advance ΔY between each pair of adjacent wall displacement positions in accordance with the equation:

$$\Delta Y = \frac{(E)(C)}{2V_T}$$

wherein

E = the difference for adjacent wall displacement positions between the difference from step (c) for one wall displacement position and the difference from step (c) for the adjacent wall displacement position;

C = the circumference of said coil; and $V_T$ = the difference for adjacent wall displacement positions between the adjacent detected signal amplitudes from step (a) divided by the number of turns between the positions at which the adjacent readings were taken.

10. A method in accordance with claim 9 wherein step (a) more particularly comprises plotting a graph of the detected signal amplitudes; and step C comprises measuring the difference between the graph and the straight line for each of said displacement positions.

* * * * *